(12) United States Patent
Ishida

(10) Patent No.: US 9,225,198 B2
(45) Date of Patent: Dec. 29, 2015

(54) POWER MONITORING AND CONTROL APPARATUS AND POWER MONITORING AND CONTROL SYSTEM

(75) Inventor: Takaharu Ishida, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 975 days.

(21) Appl. No.: 13/365,381

(22) Filed: Feb. 3, 2012

(65) Prior Publication Data

US 2012/0274268 A1    Nov. 1, 2012

(30) Foreign Application Priority Data

Apr. 28, 2011  (JP) ................................. 2011-100369

(51) Int. Cl.
| | |
|---|---|
| *H02J 7/00* | (2006.01) |
| *H02J 7/04* | (2006.01) |
| *H02J 3/14* | (2006.01) |
| *B60L 3/12* | (2006.01) |
| *B60L 11/18* | (2006.01) |

(Continued)

(52) U.S. Cl.
CPC . *H02J 7/042* (2013.01); *B60L 3/12* (2013.01); *B60L 11/1816* (2013.01); *B60L 11/1844* (2013.01); *H02J 3/14* (2013.01); *B60L 2240/547* (2013.01); *B60L 2240/549* (2013.01); *H02J 13/0006* (2013.01); *H02J 2003/003* (2013.01); *Y02E 60/721* (2013.01); *Y02T 10/7005* (2013.01); *Y02T 90/121* (2013.01); *Y02T 90/128* (2013.01); *Y02T 90/14* (2013.01); *Y02T 90/163* (2013.01); *Y02T 90/168* (2013.01); *Y04S 10/126* (2013.01); *Y04S 10/54* (2013.01); *Y04S 30/12* (2013.01)

(58) Field of Classification Search
CPC ....................................................... H02J 7/042
USPC .................. 320/109, 152, 157–159, 162–164
See application file for complete search history.

(56) References Cited

U.S. PATENT DOCUMENTS

| | | | |
|---|---|---|---|
| 5,684,379 A | 11/1997 | Svedoff | |
| 2010/0134067 A1* | 6/2010 | Baxter et al. | ............... 320/109 |
| 2011/0267009 A1 | 11/2011 | Nakatsuji et al. | |

FOREIGN PATENT DOCUMENTS

| | | |
|---|---|---|
| CN | 102005797 A | 4/2011 |
| EP | 2 200 149 A2 | 6/2010 |

(Continued)

OTHER PUBLICATIONS

Chinese Office Action dated Jan. 24, 2014 with English translation (Ten (10) pages).

(Continued)

*Primary Examiner* — Richard V Muralidar
(74) *Attorney, Agent, or Firm* — Crowell & Moring LLP

(57) ABSTRACT

A power monitoring and control apparatus and system are provided, which level charge loads of electric vehicles over an overall power system as well as make the power loads fall within the maximum contract power, in plug-in charging of the electric vehicles in individual houses. The power monitoring and control apparatus is used in charging a battery-mounted equipment from the power system through a battery charger. The apparatus compares a current value available for charging the battery-mounted equipment from the power system with a charging current value requested to the battery charger from the battery-mounted equipment, and employs as the charging current to the battery-mounted equipment a smaller one among the charging current available value and the charging request value.

6 Claims, 11 Drawing Sheets

(51) Int. Cl.
*H02J 13/00* (2006.01)
*H02J 3/00* (2006.01)

(56) References Cited

FOREIGN PATENT DOCUMENTS

| JP | 2007-271424 A | 10/2007 |
| JP | 2008-136291 A | 6/2008 |
| JP | 2011-4509 A | 1/2011 |

OTHER PUBLICATIONS

Extended European Search Report dated Jun. 30, 2015 (six (6) pages).

* cited by examiner

FIG. 8A

| BRANCH NAME | RESISTANCE | INDUCTANCE | CAPACITANCE | TAP RATIO |
|---|---|---|---|---|
| #1-#2 | | | | |
| #2-#3 | | | | |
| #3-#4 | | | | |
| #4-#5 | | | | |

| NODE NAME | PRESENCE OR ABSENCE OF GENERATOR | SPECIFIED VOLTAGE VALUE | INITIAL VOLTAGE VALUE | PG | QG | PL | QL | STATIC CONDENSER OR SHUNT REACTOR (SCShR) |
|---|---|---|---|---|---|---|---|---|
| #1 | | | | | | | | |
| #2 | | | | | | | | |
| #3 | | | | | | | | |
| #4 | | | | | | | | |

851

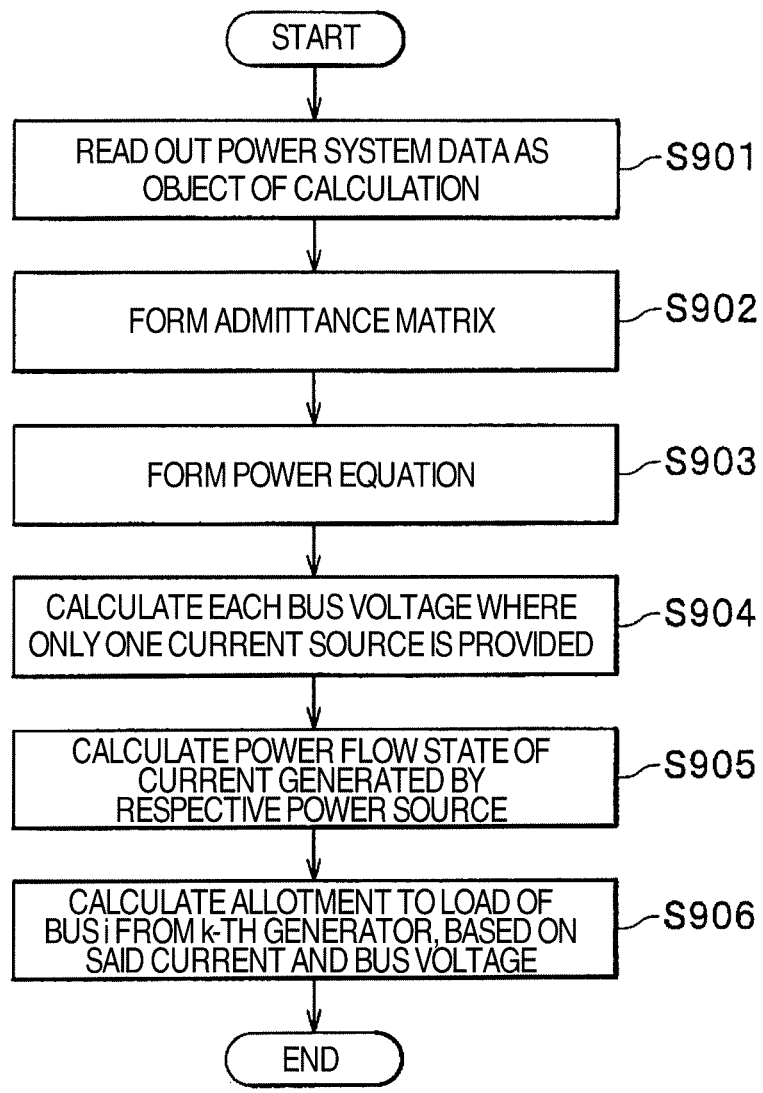

| EQUIPMENT NAME | Start_time | End_time | IMPLEMENT QUANTITY (kW) |
|---|---|---|---|
| #1 | | | |
| #2 | | | |
| #3 | | | |
| #4 | | | |

| EQUIPMENT NAME | RESISTANCE VALUE (Ω) | SENSITIVITY (kW/Ω) | UPPER LIMIT VALUE |
|---|---|---|---|
| #1 | | | |
| #2 | | | |
| #3 | | | |
| #4 | | | |

POWER MONITORING AND CONTROL APPARATUS AND POWER MONITORING AND CONTROL SYSTEM

BACKGROUND OF THE INVENTION

The present invention relates to power monitoring control apparatus and power monitoring and control system which control a departure from a voltage permissible level in a power system and a time zone for charging which takes into consideration its dependency on $CO_2$ when charging a power storage device or battery charger from the power system.

In recent years, electric vehicles are prevailing and are predicted to increase in number more and more in future. If there is established a life style that a user using an electric vehicle performs plug-in charging after returned to her or his house with the vehicle, there arises a concern that, since the plug-in charging for electric vehicle is large in load, the overall house power load in operation exceeds the maximum contract power, a circuit breaker turns off.

JP-A-2008-136291 discloses a technology for avoiding that the overall house power load during charging exceeds the maximum contract power.

It is predicted that after an average time when the users go back home from work, demand of power to an overall power system increases due to the concentration of the plug-in charging of the electric vehicles from the respective houses.

Prevailing of home-use storage batteries is predicted which is charged at nighttime during which a power rate is cheaper and is utilized for operation of air-conditioners during the daytime.

SUMMARY OF THE INVENTION

The technology disclosed in JP-A-2008-136291 is to compensate for power shortage by adjusting power consumption in each house as mentioned above. However, if the users of electric vehicle after they went back home start plug-in charging at the same time or the above-mentioned nighttime home-use power storage devices (storage batteries) are operated all at once, in other words, if battery-mounted equipment are charged all at once, the power system suffers a large load and shortage of power supply is caused in quantity even if the loads are leveled over the respective houses. Therefore, there arises a problem of causing the necessity of leveling charging loads over the overall power system. Particularly, the necessity of the leveling is indispensable for a power system having a small system capacity or the case where the occupation rate of power generation resources such as thermal power generation, gas turbine power generation or the like which is capable of absorbing a varying quantity, is low.

Therefore, the present invention has been made taking the above-mentioned circumstances into consideration. An object of the present invention is to provide power monitoring and control apparatus and a system which are capable of leveling the charging loads of the overall power system.

In order to solve the above-mentioned problems, the present invention has been configured as follows.

That is, power monitoring and control apparatus according to the present invention is directed to one used when charging battery-mounted equipment via a battery charger from a power system, and is characterized in that a current control calculation value as a current value with which the power system is capable of supplying the battery-mounted equipment and a charge request value as a current value which the battery-mounted equipment requests to the battery charger are compared, and a smaller one among the current values as a result of the comparison is employed as a current control value indicative of a charging current to the battery-mounted equipment.

A power monitoring and control system according to the present invention uses a plurality of power monitoring and control apparatus and is capable of charging a plurality of battery-mounted equipment connected to the plurality of power monitoring and control apparatus, and is characterized in that a minimum charging current value at the time of charging the battery-mounted equipment from the power system is calculated by an external controller, and the power monitoring and control apparatus downloads data relating to the power system from the external controller via a network at a point of time at which the calculated minimum charging current value becomes not to satisfy a voltage permissible value of the power system, and controls charging current to the battery-mounted equipment after the downloading data.

According to the present invention, provided are the power monitoring and control apparatus and the system therefor in which, when charging in individual houses, not only the power load can be controlled within the maximum contract power but also charging loads can be leveled over the whole power system.

Other objects, features and advantages of the invention will become apparent from the following description of the embodiments of the invention taken in conjunction with the accompanying drawings.

BRIEF DESCRIPTION OF THE DRAWINGS

FIGS. 8A and 8B are formats as specific examples of data for creating PV curves in the third embodiment of the power monitoring and control system according to the present invention; FIG. 8A is a format of data relating to overall branches of the power system to which batteries are connected, and FIG. 8B is a format of data relating to nodes.

FIG. 10 is a flowchart of a method for allocating power to loads after reading out power system data in a fourth embodiment of the power monitoring and control system according to the present invention.

FIGS. 11A and 11B are formats of a database which stores calculation results of sensitivity coefficients $W_i^k$ and calculation processes in the fourth embodiment of the power monitoring and control system; FIG. 11A is a format of data relating to items when the allocation of power to loads is determined, and FIG. 11B is a format of data relating to items when the allocation of power to loads are implemented.

DETAILED DESCRIPTION OF THE EMBODIMENTS

In the following, description will be made of the embodiments of the present invention with reference to the drawings.

Hereafter, the description of power monitoring and control apparatus will serve as the description of power monitoring and control system as well.

First Embodiment

Figure 1:
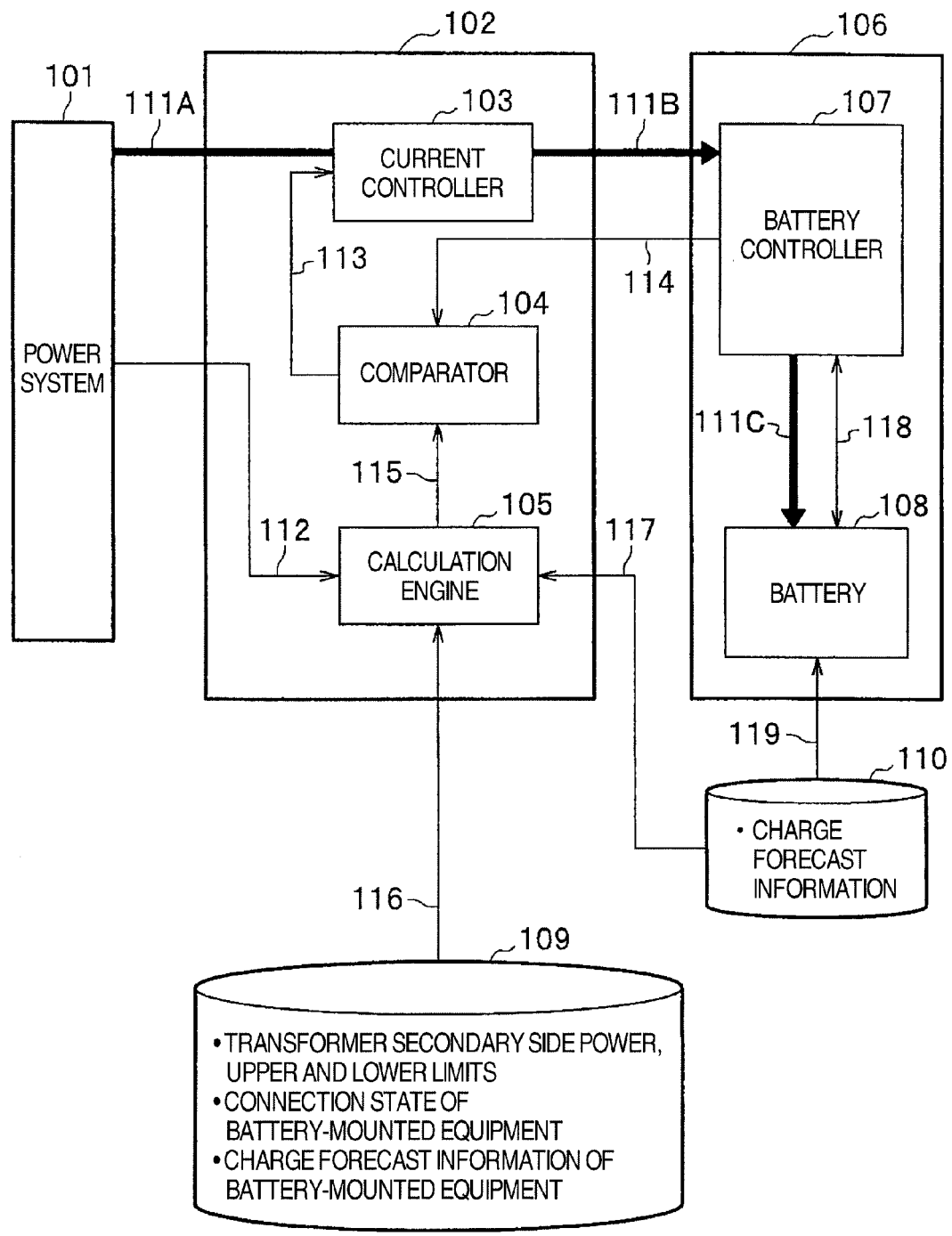
FIG. 1 is a block diagram representing a configuration of an embodiment where charging control of a battery is performed in autonomously distributed manner according to a first embodiment of a power monitoring and control apparatus of the present invention, and the relation with a power system and a storage battery.

FIG. 1 represents a configuration of an aspect where charging control of a power storage device 106 (which may be written as "storage battery" or "battery charger" as appropriate) is performed in autonomously distributed manner in the first embodiment of a power monitoring and control apparatus of the present invention and the relation with a power system 101 and the battery charger 106.

First of all, the relation of the first embodiment with the power system 101 and the battery charger 106 will be explained.

<<Relation of First Embodiment with Power System and Battery Charger>>

In FIG. 1, the power system 101 supplies power to a power monitoring and control apparatus 102 through a power line 111A. The power monitoring and control apparatus 102 monitors and controls the supplied power to supply charging power to the battery charger 106 through a power line 111B.

The power monitoring and control apparatus 102 is configured by a current controller 103, a comparator 104 and a calculation engine 105.

The comparator 104 selects a smaller one (current control value) between a current request value of a battery controller 107 which will be described later and a calculated current control value outputted from the calculation engine 105, as a charging current.

The configuration and operation of the current controller 103 and the calculation engine 105 will be described later in detail.

The battery charger 106 comprises a battery 108 and the battery controller 107 which controls charging of the battery 108. The battery controller 107 charges the battery 108 through a power line 111C.

Figure 4:
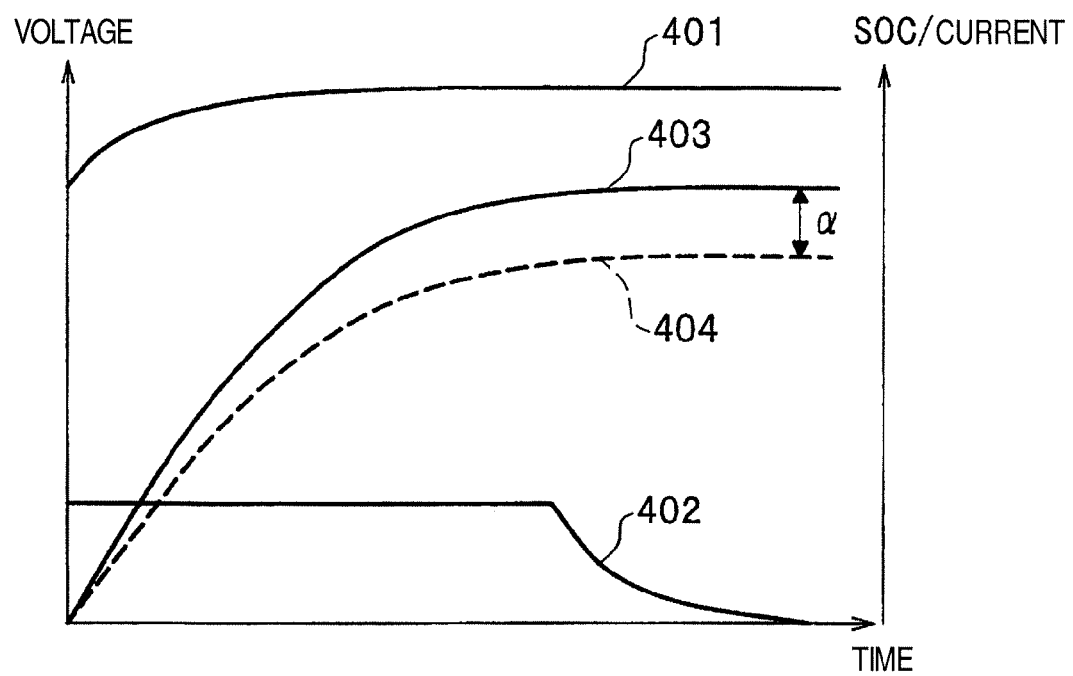
FIG. 4 is a graph representing charging characteristics of a battery in a battery charger.

A database 110 stores information concerning the battery 108 (charge forecast information), where the stored charge forecast information includes at least information on a voltage 401 and a current 402 of from charge start to charge end and a relationship with a SOC 403 curve outputted from the battery controller 107, the maximum battery rating and the maximum charging speed, as represented in FIG. 4.

The database 109 stores "transformer secondary-side power, upper and lower limits" representing transformer secondary-side power and the upper and lower limits thereof which are information appended to the calculation engine, "connection state of the battery-mounted equipment" and "charge forecast information of the battery-mounted equipment" and the like.

A communication line 112 sends sensing information from the power system 101 such as voltages, active power and reactive power at spots provided with sensors (not shown) to the calculation engine 105.

A communication line 113 sends a current control value calculated by the comparator 104 to the current controller 103.

A communication line 114 transmits a current request value requested by the battery charger 106, from the battery controller 107.

A communication line 115 transmits a current control calculation value calculated by the calculation engine 105, to the comparator 104.

A communication line 116 is used when acquiring data concerning power system such as stored history data from the database 109.

A communication line 117 transmits to the calculation engine 105, charge forecast information typically represented by schedule information which a user of the battery charger 106 beforehand inputs.

A communication line 118 transfers information between the battery controller 107 and the battery 108.

A communication line 119 is used upon fetching data concerning schedule information of the battery user and the like.

This embodiment corresponds to the case where, for example, when an electric vehicle is connected to power system, the battery mounted on the vehicle requests a charging current and the power system charges power to the electric vehicle as far as possible to respond to the request. The power control equipment (power monitoring and control apparatus) used in such a case is assumed as a mode provided in ICCB (In Cable Control Box) of MODE2 charging described in IEC (International Electro-technical Commission) 61851-1 standard.

<<Current Controller 103>>

The current controller 103 in the power monitoring and control apparatus 102 will be next described in detail.

Figure 2:
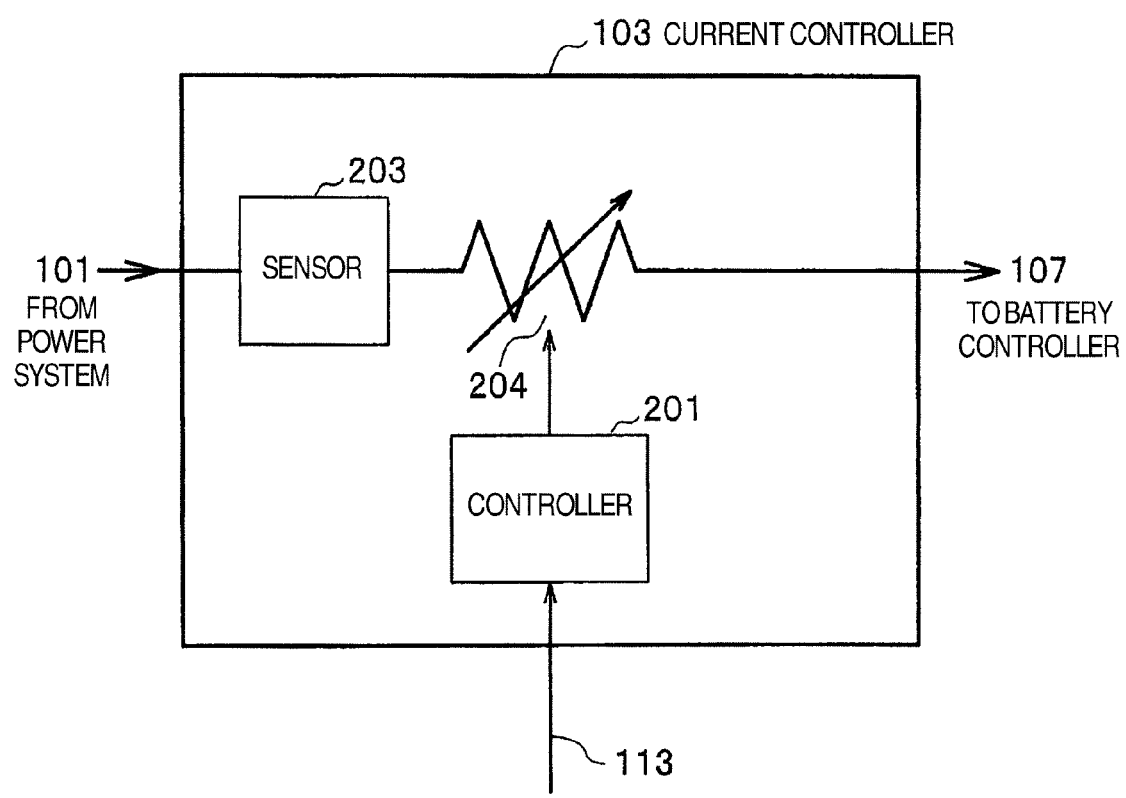
FIG. 2 is a block circuit diagram representing a circuit configuration of a current control device provided in the first embodiment of the power monitoring and control apparatus of the present invention.

FIG. 2 diagrammatically represents a circuit configuration of the current controller 103.

In FIG. 2, the current controller 103 comprises a sensor (i.e., current sensor or voltage sensor) 203, a variable resistor 204, and a controller 201.

The current controller 103 receives a power input from the power system 101, and transmits the power input to the battery controller 107 through the variable resistor 204. The controller 201 controls the variable resistor 204 so as to control the transmitted power to a current control value transmitted from the comparator 104 (FIG. 1) through the communication line 113.

Here, when the above-mentioned control method using the variable resistor 204 is carried out, the sensor 203 is not an indispensable component for the current controller 103.

Another method may be adopted which changes the current control value by connecting a current sensor or a voltage sensor as the sensor 203 in the current controller 103 and thereby monitoring the sensor current value by the controller 201. In such a case, the variable resistor 204 is not an indispensable component.

<<Processing Method by Calculation Engine 105>>

Next a processing method carried out by the calculation engine 105 (FIG. 1) will be described.

The calculation engine 105 has a function of determining a control value for controlling a charging current to the battery charger 106 to which the power monitoring and control apparatus 102 (FIG. 1) is connected. The current control value determination is performed by inputting data such as the above-mentioned sensing data from the power system 101 (FIG. 1), transformer secondary-side power, upper and lower voltage limits, information on a connection state of battery-mounted equipment, charge forecast information on the battery-mounted equipment and the like.

<<Flowchart Showing Processing Method of Calculation Engine 105>>

Figure 3:
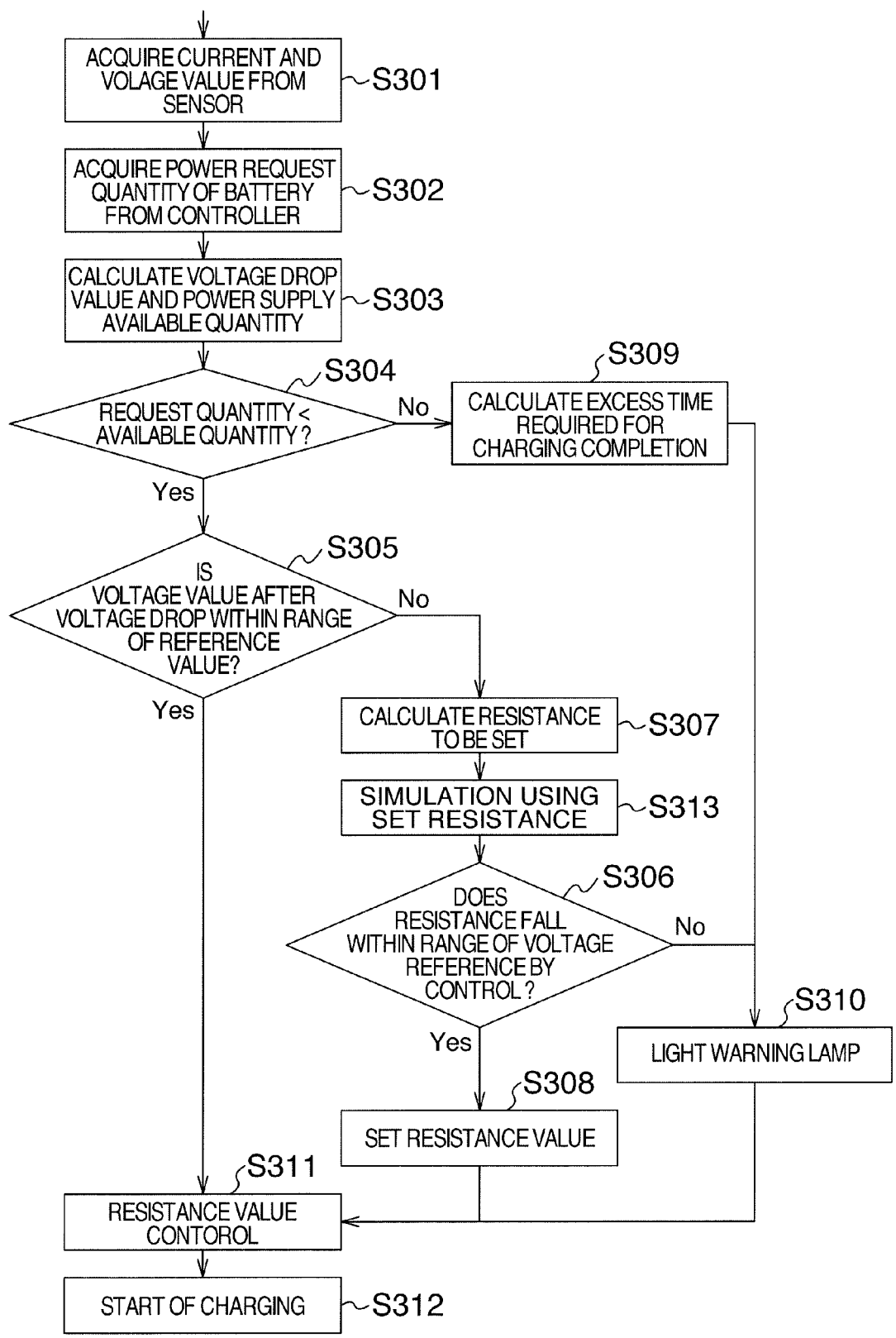
FIG. 3 is a flowchart representing a processing method in a calculation engine provided in the first embodiment of the power monitoring and control apparatus of the present invention.

FIG. 3 represents in flowchart a processing method of the calculation engine 105 (FIG. 1).

In FIG. 3, the processing procedures are represented.

First of all, a current value and a voltage value which are measured by a sensor (not shown) based on sensing information of the power system 101 (FIG. 1) are acquired, through the communication line 112 (FIG. 1) (Step S301).

In the flowchart of FIG. 3, step S301 is simply written as "ACQUIRE CURRENT AND VOLTAGE VALUES FROM SENSOR"

Next, a charging power request quantity (charging power request value) of the battery charger 106 is acquired from the battery controller 107 (FIG. 1) through the communication line 114 (FIG. 1) (Step S302).

The communication line 114 is connected to the power monitoring and control apparatus 102, and therefore, the calculation engine 105 (FIG. 1) included in the apparatus 102 can acquire information on the communication line 114.

In the flowchart of FIG. 3, step S302 is written in simplified form as "AQUIRE POWER REQUEST QUANTITY OF BATTERY FROM CONTROLLER".

Next, based on the current value and the voltage value of the power system 101 (FIG. 1) acquired in step S301, the voltage drop value and power supply available quantity (current control calculation value) when power is supplied are calculated (Step S303).

In the flowchart of FIG. 3, step S303 is simply written as "CALCULATE VOLTAGE DROP VALUE AND POWER SUPPLY AVAILABLE QUANTITY".

Next, the charging power request quantity (charging request value) of the battery charger 106 (FIG. 1) acquired in step S302 is compared with the power supply available quantity (current control calculation value) acquired in step S303 (Step S304).

If the charging power request quantity is equal to or smaller than the power supply available quantity (if Yes), the processing proceeds to step S305, while if the former is greater than the latter (if No), the processing proceeds to step S309.

In the flowchart of FIG. 3, step S304 is simplify written as "REQUEST QUANTITY≤AVAILABLE QUANTITY".

Next, description will be made of step S305 to which the processing proceeds in the case of Yes in step S304.

When the charging power request quantity is supplied, a voltage drop occurs. Then, it is determined whether the dropped voltage is within a range of a given reference value or not (Step S305).

If the voltage after the drop falls within the given reference value in range (if Yes), the processing proceeds to a step S311, while if it does not fall within the range of the given reference value (if No), the processing proceeds to a step S306.

In the flowchart of FIG. 3, step S305 is written in simplified form as "IS VOLTAGE VALUE AFTER VOLTAGE DROP WITHIN RANGE OF REFERENCE VALUE?"

Next, description will be made of the step S311 to which the proceeding proceeds when "Yes" is indicated in step S305.

The step S311 is responsive to the result of a determination that the voltage drop when the request quantity of charging power is supplied is within the range of the given reference value. Therefore, the resistance value control is performed using the variable resistor 204 as the resistance value made as it is (step S311).

In the flowchart of FIG. 3, step S311 is simply written as "RESISTANCE VALUE CONTROL".

The current controller 103 provided with the variable resistor 204 using the resistance value as it is starts charging to the battery charger 106 (step S312).

In the flowchart of FIG. 3, step S312 is simply written as "START OF CHARGING".

Turning back to step S305, if it is determined that the voltage after drop is not within the range of the reference value (if No) in step S305, the processing proceeds to step S307.

Next, description will be made of step S307 which will proceed when the step S306 is "Yes".

In step S306, it is determined that if the resistance of variable resistor 204 is controlled, the voltage drop will be within the range of the voltage reference. Therefore, a resistance value of resistor 204 to be set is calculated so that the voltage drop may be within the range of the voltage reference (step S307).

The resistance value may be simply obtained by calculating the resistance only for compensating an amount of the departure of the voltage based on voltage and current values acquired by a sensor of the power system (not shown) through the communication line 112. Alternatively, the resistance value may be obtained in detail by substituting a resistance value for the quantity of an instruction for realizing a charging quantity, which is determined according to a flowchart calculating the charge allotment which will be described in another embodiment mentioned later.

In the flowchart of FIG. 3, step S307 is written in simplified form as "CALCULATE RESISTANCE TO BE SET".

Though it has been determined that the voltage drop when the request quantity of charging power is supplied will not be within the range of the reference voltage, a simulation is carried out by newly controlling and setting the resistance of variable resistor 204 in the current controller 103 based on the calculation result described in step S307 (step S313). Based on the result of the simulation it is determined whether the voltage drop is within the range of the voltage reference (step S306).

When the resistance control makes the voltage drop to be within the range of the voltage reference (if Yes), the processing proceeds to step S308, while when it is not within the range of the voltage reference (if No), the processing proceeds to Step S310.

In the flowchart of FIG. 3, step S306 is simply written as "DOES RESISTANCE FALL WITHIN RANGE OF VOLTAGE REFERENCE BY CONTROL?"

The resistance value calculated in step S307 is set as the variable resistor 204 (step S308).

In the flowchart of FIG. 3, step S308 is written in simplified form as "SET RESISTANCE VALUE".

Resistance control (step S311) is carried out using the resistance value newly set in the variable resistor 204, and charging of the battery charger 106 (FIG. 1) starts (step S312).

The detailed description on step S311 and step S312 will be omitted to avoid the repetition.

Description will be next made of step S310 to which the processing proceeds when not affirmed (No) in step S306.

When the voltage departure is not eliminated even by the control of the resistance of the variable resistor 204 in step S306, a warning lamp is displayed on, for example, a set area of a navigator built in the vehicle in any manner (step S310).

In the flowchart of FIG. 3, step S310 is written in simplified form as "LIGHT WARNING LAMP".

After then, the start of charging in step S312 via step S311 is suppressed. The suppression of the charging start is continued until the voltage after drop falls within the range of the reference voltage, when the above-mentioned flow procedures are repeated at the next control time period. At a time when the voltage after drop falls within the range of the reference voltage, charging of battery 108 will start.

Returning back to step S304 the embodiment will be described.

In step S304, when as a result of comparison between the charging power request quantity and the power supply available quantity it is determined that the former is equal to or greater than the latter (if No), the processing proceeds to step S309.

Then, since the power supply available quantity is smaller than the charging power request quantity, the charging will not be completed within a given period of time, so that an excess time required for the completion of the charging is calculated (step S309).

Next, the warning lamp is displayed on, for example, the navigation provided on the vehicle in any display manner (step S310).

After then, though the full charge within the given period of time is not guaranteed, starting of charging in step S312 via step S311 is carried out. If any change does not occur in the above-mentioned situation when the above-mentioned flow procedures are repeated at the next control time period, the warning display using the warning lamp and the charging under the condition without guarantee to full charge are continuously carried out. If any change occurs in the situation, a processing under new situation is carried out according to the above-mentioned flow procedures.

In the foregoing, according to the first embodiment of the present invention, the power monitoring and control apparatus 102 comprises the current controller 103, the comparator 104 and the calculation engine 105. In such a configuration, by using the current request quantity of the battery charger 106 and the minimum current of the charging current on the side of the power system which is determined by the calculation engine 105, even though the plurality of battery chargers 106 start charging all at once in autonomously distributed fashion, the quantity of charging current is suppressed such that an impact due to load change can be reduced in the power system 101. As a result, it becomes possible to provide stable operation of the power system 101.

Second Embodiment

Next, description will be made of an aspect and method for correcting the quantity of the current request of the battery charger 106 (FIG. 1) in the second embodiment according to the power monitoring and control apparatus of the present invention.

FIG. 4 represents charging characteristics of the battery 108 (FIG. 1) in the battery charger 106 (FIG. 1).

In FIG. 4, the abscissa in coordinates indicates a charging time, the left-side ordinate indicates a voltage value, and a right-side ordinate indicates an SOC (State of Charge, which is defined as the rate of actual charge to the full charge) or a current value.

A characteristic curve 401 is an example of a voltage change occurring during the charging.

A characteristic curve 402 is an example of a current change occurring during the charging.

A characteristic curve 403 is an example in which a change in the charge time of SOC in a new battery occurs.

A characteristic curve 404 is an example in which a change in the charge time of SOC in a battery in which an aged change occurs.

It is known that the maximum power quantity available for charging decreases depending upon the utilization method of a battery, especially a lithium battery, and aged deterioration thereof. For example, a new battery has a tendency of exhibiting a difference or gap in the values of the voltage, current and SOC shown in FIG. 4, as indicated by the characteristic curves 403 and 404.

This is because, when, for example, a deteriorated battery has a full charge state lower by 10% than that of the new battery, the total quantity is 90% even though the battery controller 107 (FIG. 1) transmits data which is SOC=100%. In this manner, if an actual charge rating is discrepant with a labeled charge rating, a differential between the ratings becomes a loss (e.g. thermal loss) even though the full charge can be accomplished with smaller power.

In order to correct a loss caused in the case where a battery requests the full charge with similar power as used for the new battery, a history data of battery charging as represented in FIG. 4 is stored, an aged change characteristic α is determined from the stored history data, and correction is performed for the actual SOC value and the charging current value based on the determined change characteristic α. By using such a correcting method, the power loss can be reduced and efficient charging of battery can be carried out.

According to the second embodiment, the charging current quantity is controlled using in the calculation engine, a deterioration coefficient caused due to a change with time of the battery in the battery charger, thereby making it possible to perform charging with a low loss.

Third Embodiment

Description will be made of a method for issuing an instruction to the current controller 103 which decides the priority order of charging to the plurality of batteries 106 and the charging current quantity to each battery, in a power monitoring and control apparatus according to the third embodiment of the present invention.

<<Relation of the Third Embodiment with Power System and Battery Charger>>

Figure 5:
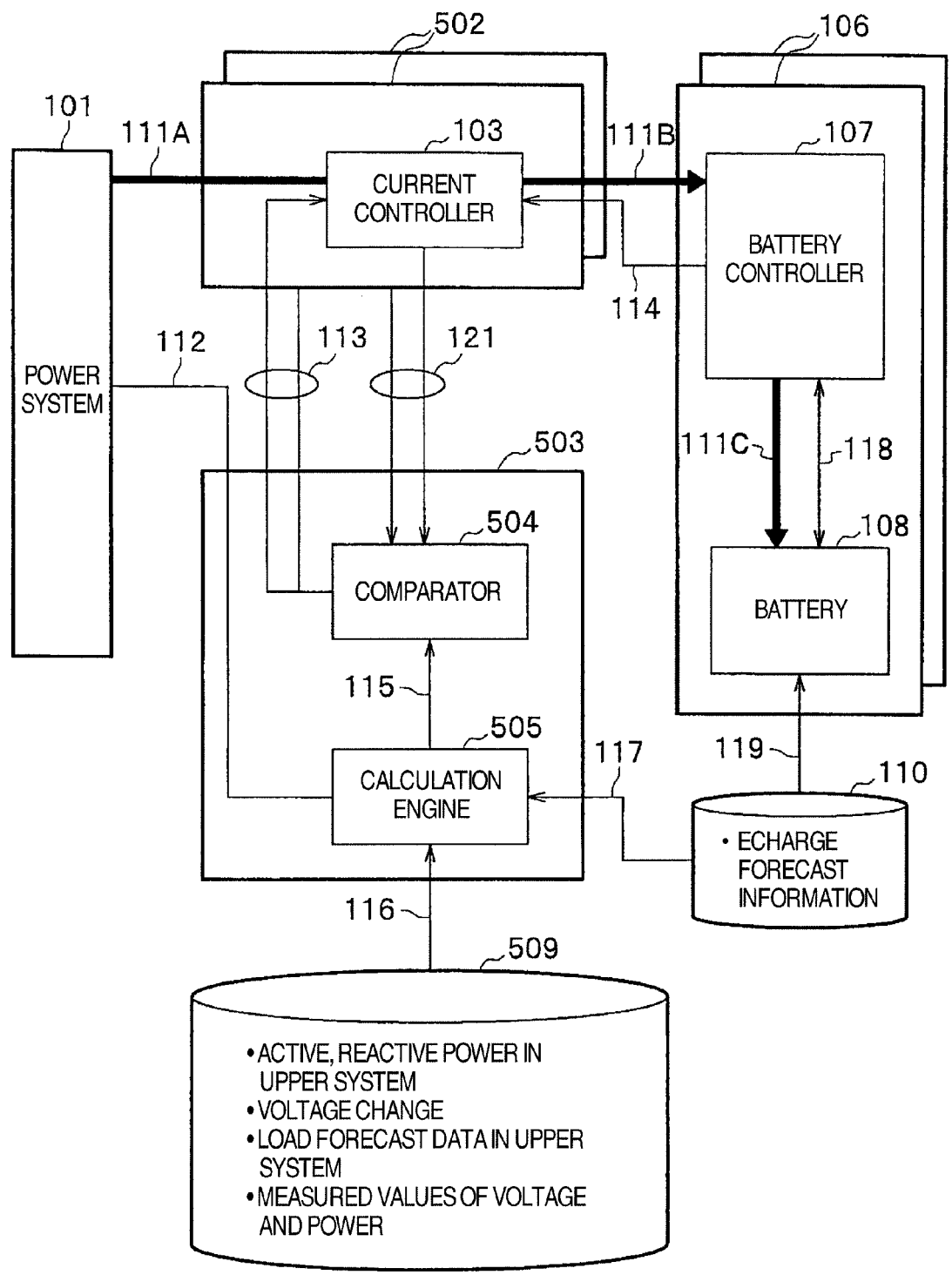
FIG. 5 is a block diagram representing a configuration of a power monitoring and control system according to a third embodiment of the present invention.

FIG. 5 represents the configuration of a system comprising a plurality of battery chargers 106 and a plurality of power monitoring and control apparatus 502 in correspondence to the battery chargers, in which the power monitoring and control apparatus 502 are controlled by a management controller (external controller) 503 deciding current control values therefor, so that the management controller 503 manages the charging of the battery chargers 106.

In FIG. 5, the power system 101 supplies power to the plurality of power monitoring and control apparatus 502 via the power line 111A, the plurality of power monitoring and control apparatus 502 monitor and control the plurality of battery chargers 106 to input charging power thereto.

The plurality of power monitoring and control apparatus 502 include respective current controllers 103.

The management controller 503 comprises a comparator 504 and a calculation engine 505.

Each of the plurality of battery chargers 106 comprises a battery 108, and a battery controller 107 for controlling charging of the battery 108. The battery 108 is charged by battery controller 107 via the power line 111C.

A database 110 stores information concerning the battery 108, and stores "charge forecast information" regarding the battery 108, where the stored charge forecast information includes at least information on a voltage 401 and a current 402 of from charge start to charge end, a relationship with a SOC 403 curve outputted from the battery controller 107, the maximum battery rating and the maximum charging speed, as represented in FIG. 4.

A database 509 is appended to the calculation engine 505, and stores information on "active power and reactive power in an upper-rank system" which represents active power and reactive power in an upper-rank power system, "change of voltage" in the power system, "load forecast data in the upper-rank (power) system" and "measured values of voltage and power".

A communication line 112 sends to the calculation engine 505, sensing information from the power system 101 such as voltages, active power and reactive power at spots provided with sensors.

A plurality of communication lines 113 communicate respective current control values calculated by the comparator 504 to the respective current controllers 103 as inputs thereof.

Each communication line 114 transmits a current request value requested by a battery to the respective one of a plurality of current controllers 103, from the respective battery controller 107.

A communication line 115 transmits a current control calculation value calculated by the calculation engine 505, to the comparator 504.

A communication line 116 is used when data including stored history data is acquired from the database 509.

A communication line 117 transmits to the calculation engine 505, charge forecast information typically represented by schedule information which a user of the battery charger 106 beforehand inputs.

A communication line 118 transmits information between the battery controller 107 and the battery 108.

A communication line 119 is used upon fetching data concerning schedule information of the user of the battery charger 106 or the like.

This embodiment corresponds to the case when, for example, an electric vehicle (not shown) is connected to the power system 101, the battery (battery charger 106) mounted on the vehicle requests a charging current and the power system charges power to the electric vehicle as far as possible to respond to the request. The power control equipment (power monitoring and control apparatus 502) used in such a case is assumed as a mode provided in ICCB (In Cable Control Box) of MODE2 charging described in IEC (International Electro-technical Commission) 61851-1 standard.

Another aspect may be assumed in which each power monitoring and control apparatus 502 is applied to each battery charger and is controlled by the management controller 503 in the equipment on the side of charging infrastructure of MODE3 charging described in the IEC 61851-1 standard.

<<Calculation Engine 505>>

As the third embodiment the operation processing using calculation engine 505 represented in FIG. 5 will be described.

Another method for obtaining a control current quantity in the calculation engine 505 will be described by an example of calculation using voltage stability with reference to FIG. 6.

Figure 6:
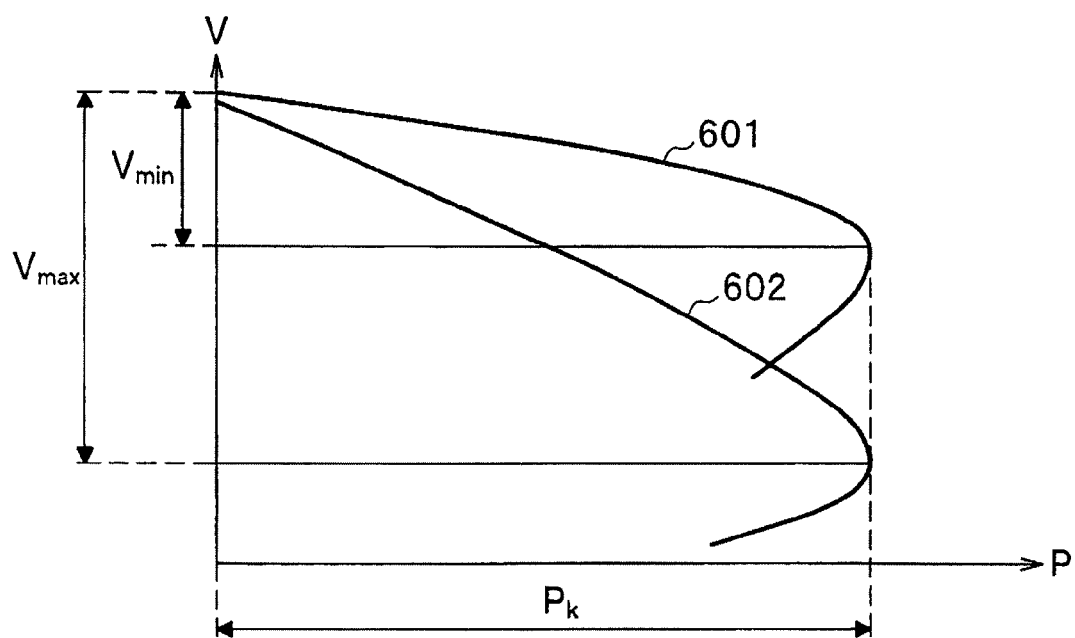
FIG. 6 is a characteristic diagram representing a so-called PV curve for calculating a voltage drop at each spot when a limit load is determined from the current power load, in a power system to which battery chargers are connected.

FIG. 6 diagrammatically represents characteristics called P-V curves from which a voltage drop at each spot when a limit load is determined from a current power limit is calculated, in the power system 101 to which a battery to be charged (battery charger 106) is connected.

The abscissa represents power P and the ordinate represents a voltage V.

FIG. 6 represents P-V curves of a characteristic curve 601 and a characteristic curve 602. Among the P-V curves, it is indicated that the smaller the decrease of the curve in the ordinate direction with respect to the increase in the abscissa direction is, the better the voltage stability is. Therefore, it is desired to charge a battery at a spot at which the voltage does not decrease even with increase of load in charging.

Defining that the limit of a load is $P_k$, and a voltage $V_k$ at which the load reaches the limit is:

$$V_k(V(P=P_k)-V(P=0)),$$

and further defining that the limit of a load is $P_k$, among voltages $V_k$ at spots (location at which the battery charger 106 is installed) to which many vehicles are connected, the voltage at a spot at which the voltage drop is minimum when the load reaches the limit is $V_{min}$, and the voltage at a spot at which the voltage drop is maximum upon reach of the load limit is $V_{max}$.

Accordingly, the following relation is established:

$$V_{min} \leq V_k \leq V_{max}.$$

A method of allocating how much the charging quantity is allocated based on $V_{min}$ and $V_{max}$ determined here will be described with reference to FIG. 7.

<<Flowchart of Method for Calculating Charging Quantity>>

Figure 7:
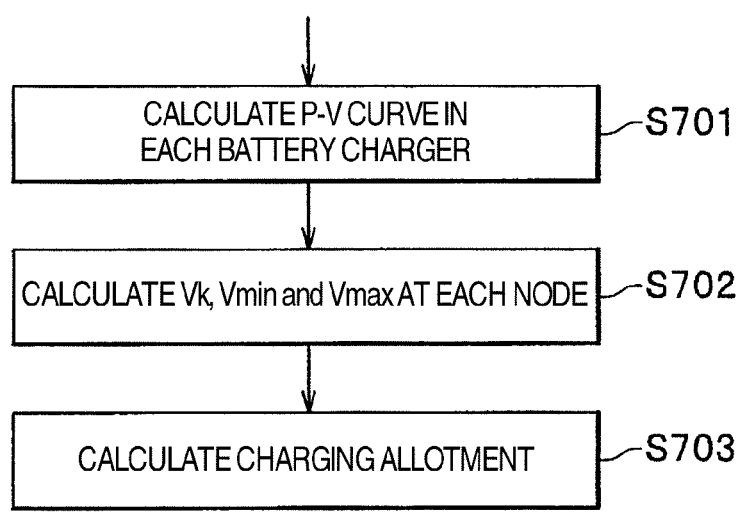
FIG. 7 is a flowchart of a method for calculating allotment of charge to each battery charger from the characteristics of the PV curve in the third embodiment of the power monitoring and control system according to the present invention.

FIG. 7 represents a flow chart of a method for calculating a charging allotment of each battery charger 106 from P-V curves at spots at which a plurality of battery chargers 106 are installed.

At first, data for creating P-V curves (nose curves) in the plurality of power storage devices 106 which are battery chargers is acquired, and thereby the nose curves are calculated (step S701).

In the flowchart of FIG. 7, the step S701 is simply written as "CALCULATE OF P-V CURVE IN EACH BATTERY CHARGER".

Examples of the items of data and format for creating P-V curves will be described later (refer to FIG. 8).

From the P-V curves calculated in step S701, $V_k$, $V_{min}$ and $V_{max}$ at each node are calculated (step S702).

In the flowchart of FIG. 7, the step S702 is simply written as "CALCULATE $V_k$, $V_{min}$ AND Vmax AT EACH NODE".

Based on the values of $V_k$, $V_{min}$ and $V_{max}$ obtained in step S702, a charging allotment to a battery charger (power storage device 106, node number #k) is calculated and determined by Equation 1 and Equation 2 indicated somewhat later (step S703).

In the flowchart of FIG. 7, the step S703 is simply written as "CALCULATE CHARGING ALLOTMENT".

A calculation method of "CALCULATE CHARGING ALLOTMENT" in step S703 will be described in detail. A calculation process value $Score^k$ is calculated by Equation 1, and based on the obtained $Score^k$ a charging allotment $Load_{add}^k$ to the battery charger (power storage device 106) having the node number #k is calculated by Equation 2. The Equation 1 and the Equation 2 are as indicated below. Here, (allotment) in Equation 2 is the allotment of power to a corresponding overall power system.

[Equation 1]

$$Score^k = \left(\frac{1}{V_{min} - V_{max}} \times V_k - \frac{V_{max}}{V_{min} - V_{max}}\right) \quad (1)$$

[Equation 2]

$$Load_{add}^k = \frac{Score^k}{\sum_i Score^i} \times (\text{allotment}) \quad (2)$$

The examples of items of data and format for creating P-V curves in the step S701 will be now described though mentioned above so.

FIGS. 8A and 8B represent formats as specific examples of data for creating P-V curves.

A format 850 represented in FIG. 8A indicates an example of data format regarding power lines and transformers (hereafter referred to as "branch" suitably) in an overall power system with which batteries are connected. The data in the format includes a branch name, a resistance part, an inductance part and a capacitance part of the branch, and a tap ratio, which are indicated by PU (per unit) and stored.

A format 851 shown in FIG. 8B indicates an example of a data format regarding loads (nodes). The data in the format includes a node name, presence or absence of generator, specified voltage value, specified voltage initial value, active power of generator (PG), reactive power of generator (QG), active power of load (PL), reactive power of load (QL), presence or absence of phase modifying equipment, and static condenser or shunt reactor of the equipment (SCShR). The P-V curves are created using these data.

In the manner as mentioned above, a current control value for each battery charger 106 calculated by calculation engine 505 is individually compared with a current request value of the each battery charger which is periodically sent to the management controller 503 from the battery charger 106 via the communication line 121. Thus, requested current values from respective battery chargers 106 are compared with control current values calculated by calculation engine 505 for the respective battery chargers, so that their minimum values are transmitted to the current controllers 103 via the communication lines 113, and charging of the battery chargers 106 included within an area to be managed is carried out so as to protect the voltage allowable range from departing from a reference voltage in the area managed by the management controller 503.

According to the third embodiment of the present invention as mentioned above, the calculation engine 505 controls the quantity of charging for each battery charger 106 with calculating the voltage stability so that the voltage of power system 101 within the managed area by the management controller 503 may fall in the voltage allowable range with respect to the reference value, thus making it possible to maintain and manage the power system of high voltage quality.

Fourth Embodiment

Description will be made of another aspect of calculation method by a calculation engine in a power monitoring and control system according to a fourth embodiment of the present invention, with reference to FIG. 9 and FIG. 10.

Figure 9:
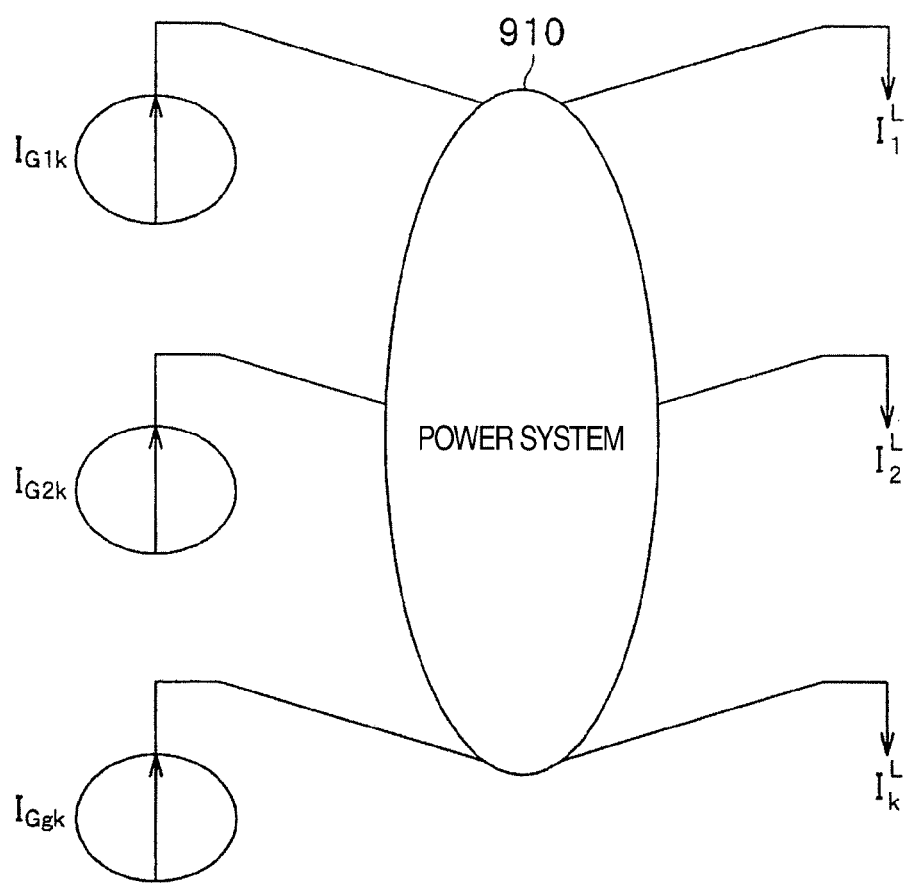
FIG. 9 is a schematic diagram simply representing the relation between a generation side and a load side of the power system to which battery chargers as a plurality of objects to be controlled are connected.

FIG. 9 schematically represents in simple manner the relation between a generation side and a load side of a power system 910 to which a plurality of battery chargers 106 to be controlled (FIGS. 1 and 5) are connected.

$I_{G1K}$, $I_{G2K}$ and $I_{GgK}$ in FIG. 9 represent currents at respective nodes on the generator side (installed locations), and $I_1^L$, $I_2^L$ and $I_K^L$ in FIG. 9 represent currents at respective nodes on the load side (installed locations). FIG. 9 will be referred to by citing the drawing suitably in the description of flowchart of FIG. 10.

<<Outline of Calculation Method of Load Allocation>>

In the power system 910, when the current at a spot at which the battery charger 106 (FIGS. 1 and 5) is installed is changed minutely, assuming that objective generators and loads in the power system are expressed in the form of currents (i.e. the generator side by $I_{G1K}$, $I_{G2K}$ and $I_{GgK}$ and the load side by $I_1^L$, $I_2^L$ and $I_K^L$), a priority order of charging to a plurality of battery chargers 106 and quantities of charging to the battery chargers are determined using a sensitivity coefficient (indicated in Equation 5 described later) representing to what extent the system state changes when any one node expressed as a current source is changed minutely using a power equation indicated by Equation 4 described later. That is, in charging, a spot at which the voltage does not drop even with increase of load and a method by which a burden is smaller when viewed from the power system 910 are chosen.

<<Flowchart of Calculation Method of Load Allocation>>

FIG. 10 represents a flowchart of a method for calculating allocation of power to loads after power system data of the power system 910 is read out.

Referring to FIG. 10, specific procedures and calculation method are represented.

Regarding objective power system data which is made by a system configuration generating unit (not shown), a resistance part, inductance part, capacitance part, tap ratio (when the branch is a transformer, presence or absence of generator in node) of branch and the like are read out from the data of the format 850 represented in FIG. 8A (step S901).

In the flowchart of FIG. 10, step S901 is simply written as "READ OUT POWER SYSTEM DATA AS OBJECT OF CALCULATION".

Based on the data read out in step S901, an admittance matrix (Equation 3) of a bus of the power system 910 is formed (step S902).

In the flowchart of FIG. 10, step S902 is simply written as "FORM ADMITTANCE MATRIX".

[Equation 3]

$$\begin{bmatrix} Y_{GG} & Y_{GL} \\ Y_{LG} & Y_{LL} \end{bmatrix} \quad (3)$$

Using the admittance matrix (Equation 3) of the bus formed in step S902, a power equation (Equation 4) represented by a matrix in the bus of the power system 910 is formed (step S903).

In the flowchart of FIG. 10, step S903 is simply written as "FORM POWER EQUATION".

[Equation 4]

$$\begin{bmatrix} I_G \\ 0 \end{bmatrix} = \begin{bmatrix} Y_{GG} & Y_{GL} \\ Y_{LG} & Y_{LL} \end{bmatrix} \begin{bmatrix} V_G \\ V_L \end{bmatrix} \quad (4)$$

Here, I ($I_G$) indicates a bus current, Y ($Y_{GG}$, $Y_{GL}$, $Y_{LG}$, $Y_{LL}$) indicates an admittance matrix of the bus, V ($V_G$, $V_L$) indicates a bus voltage. The suffix "G" indicates a relation to the generator side and the suffix "L" indicates a relation to the load side. The above-mentioned I, Y, V are generally expressed by a complex number, and therefore, a dot (•) indicating the complex number is put at the top of number character conventionally. However, the dot notation is omitted here, for the convenience of expression.

In the left side of the matrix of Equation 4, the bus current on the generator side is written as $I_G$ while the bus current on the load side is 0. This is because the influence of the generator to the load voltage is determined by making the current on the load at 0.

Equation 4 uses the admittance matrix, which may be regarded as using the impedance of power system because the admittance and the impedance are related with each other.

Next, each bus voltage where only one current source from each generator node is provided is calculated based on Equation 4 (step S904).

In the flowchart of FIG. 10, step S904 is simply written as "CALCULATE EACH BUS VOLTAGE WHERE ONLY ONE CURRENT SOURCE FROM EACH GENERATOR NODE IS PROVIDED".

Using the above-mentioned bus voltage calculated in step S905 and the above-mentioned admittance matrix (Equation 3) calculated in step S902, a power flow state of current generated by the respective power source is calculated (step S905).

In the flowchart of FIG. 10, step S905 is simply written as "CALCULATE POWER FLOW STATE OF CURRENT GENERATED BY RESPECTIVE POWER SOURCE".

Based on the above-mentioned current indicating the power flow state calculated in step S905 and the bus voltage, an allotment of current to the load of bus i from a k-th node (generator) is calculated according to Equation 5 described in the following (step S906).

The sensitivity coefficient determined by $W_i^k$ in Equation 5 is sequentially recorded as history data into the database 509. Based on the recorded data it is analyzed whether the change quantity is what kind of minute change of each node. Results of the analysis are stored in the database 509 in formats 852 and 853 of FIGS. 11A and 11B, respectively.

In the flowchart of FIG. 10, step S906 is simply written as "CALCULATE ALLOTMENT TO LOAD OF BUS i FROM k-th GENERATOR, BASED ON SAID CURRENT AND BUS VOLTAGE".

[Equation 5]

$$W_i^k = V_i \times (I_i^k)^* \tag{5}$$

Here, $W_i^k$ indicated in Equation 5 is an allotment to load of a bus i from a k-th node (generator), and indicates the sensitivity coefficient, as mentioned above.

$V_i$ indicates a voltage value in the bus i, and $I_i^k$ indicates a current value from the k-th generator in the bus i.

"*" attached to $(I_i^k)$ on the right side of Equation 5 expresses a conjugate complex number of $(I_i^k)$.

Since the right side of Equation 5 indicates a product of the voltage $V_i$ which is a complex number and the current $(I_i^k)^*$ indicating a conjugate complex number of the current $(I_i^k)$ which is a complex number, Equation 5 corresponds to the active power.

Description of formats 852 and 853 of the database represented in FIGS. 11A and 11B will be now supplemented.

FIGS. 11A and 11B represent formats of the database storing calculation results of the sensitivity coefficient $W_i^k$ which corresponds to the load of the bus. The format 853 shown in FIG. 11A includes items of "resistance (Ω)", "sensitivity KW/Ω" and "upper limit" in determining allotments to the loads. The format 852 of FIG. 11B includes items of "start time", "end time" and "implement quantity" in implementing the allotments to the loads.

<<Charging to Battery Charger Taking Dependency on $CO_2$ into Consideration>>

When reproducible energy such as solar power generation, wind power generation or the like is applied to a power system to which a battery is connected, not only control from a viewpoint of the stability of power system, but also power supply taking into consideration the dependency of charging power on $CO_2$ and charging to a battery charger are performed.

Using a minute change in each node due to the above-mentioned sensitivity coefficient, it is possible to reduce the dependency on $CO_2$ for the battery charger.

According to a specific method, in a time zone during which power with high dependency on $CO_2$ is charged at the request of the user of battery charger, the calculation engine 505 transmits a calculation result of limiting a control current quantity to the comparator 504, while in another time zone during which charging with power having low dependency on $CO_2$ is possible, the calculation engine 505 makes charging with a control current quantity which corresponds to the charging current as requested from the battery charger 106.

By such operation, it will be possible to reduce the dependency on $CO_2$ for the battery charger 106.

In calculation engine 505 embodied in the fourth embodiment of the present invention, it becomes possible to implement charging which reduces the dependency on $CO_2$ within the managed area by a management controller 503, using the function of calculating the degree of dependency on $CO_2$ of charging power.

Other Embodiments

The present invention should not be limited to the embodiments mentioned above.

In the current controller 103 according to power monitoring and control apparatus 102 of the first embodiment, the approach of controlling the current value using the variable resistor 204 and the sensor 203 was disclosed, however, the current controller is not limited to only such approach. Alternatively, another approach may be used of performing intermittent control with provision of a relay to thereby control the watt-hour (WH) value for charging power. This approach does not contribute to make the charging power fall within the maximum contract power limit in each house, but does contribute to the leveling of load power in a wide area power system and charging taking the reduction of dependency on $CO_2$ into consideration.

In step S310 of flowchart (FIG. 3) representing the processing method of the calculation engine 105 according to the first embodiment, if the charging condition is not always met, the warning lamp was made to display in any manner. In addition to this effect, a message may be displayed. Warning or guidance by speech may be employed.

Though the present invention is directed mainly to the power monitoring and control system for charging to electric vehicles, the invention provides effective procedures in plug-in charging to hybrid cars as well.

Further, the present invention is applicable to general motor-driven transportation equipment on which batteries are installed as well as automobiles.

The present invention provides the power monitoring and control apparatus (power control equipment) used in battery charging, which minimizes the departure from the reference voltage of power system within the voltage allowance range in the charging of the battery charger, or minimizes the dependency on $CO_2$.

According to the present invention, the power monitoring and control apparatus (power control equipment) is provided between the power system and the battery controller-mounted battery to thereby monitor the current of power charging the battery and at the same time, control the charging current within the supply available range from the power system side. On this occasion, the minimum current value between the current value requested from the battery and the current value of power available for supply from power system side is defined as the current value which is to be supplied from the power system. By making such definition or procedures, even when full power requested from the battery side can not be supplied from the power system side, charging on the battery side is still possible though the charging period of time increases correspondingly.

When calculating the power available from the power system side, there is used a method of determining the priority order of charging between the batteries and their quantities of current based on the sensitivity coefficient of current incremental in the power system or a method of determining the priority order of charging between the batteries and their quantities of current using voltage stability in an objective power system.

For control of power system side, there are a method of controlling charging current with individual batteries being controlled for charging in autonomously distributed manner, and another method of performing charging control to a plurality of batteries collectively in concentrated manner. The two kinds of method both are used in the invention.

According to the present invention, even though batteries, particularly, batteries for electric vehicle use, which are predicted to simultaneously start charging, increase in number abruptly, the quantities of charging to the batteries are controlled individually, so that the power system to which the battery belongs is free from an abrupt voltage drop and lowering of power quality. Accordingly, the manager of power transmission and distribution can make stable operation of the power system.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A power monitoring and control apparatus for use in charging battery-mounted equipment from a power system through a battery charger, wherein
   a current control calculation value indicative of a current value available for charging the battery-mounted equipment from the power system and a charging request value indicative of a current value requested to the battery charger from the battery-mounted equipment are compared;
   smaller one among the current control calculation value and the charging request value is employed as a current control value indicative of a charging current to the battery-mounted equipment;
   a plurality of the battery chargers and a plurality of the battery-mounted equipment are connected to the power system;
   a current value or a voltage value in the power system acquired by a sensor at a predetermined period, and a coefficient of incremental current determined based on impedance compared with current on the bus of the power system is calculated; and
   the battery-mounted equipment to be charged and a supply current quantity to the battery-mounted equipment are determined based on the calculated sensitivity coefficient.

2. A power monitoring and control apparatus according to claim 1, wherein the current value available for charging the battery-mounted equipment from the power system is calculated based on:
   a secondary-side voltage of a transformer of the power system to which the battery charger is connected;
   upper and lower limits of the secondary-side voltage;
   a connection state of the battery-mounted equipment; and
   charging estimation information of the battery-mounted equipment.

3. A power monitoring and control apparatus according to claim 1, wherein the current value available for charging the battery-mounted equipment from the power system is calculated based on:
   a voltage value of a bus to which the battery-mounted equipment is connected;
   a voltage stability for the bus;
   upper and lower limits of the voltage stability; and
   a connection state of the battery-mounted equipment.

4. A power monitoring and control apparatus according to claim 1, wherein the current value available for charging the battery-mounted equipment from the power system is calculated based on: at least an SOC (state of charge) value of the battery collected from the battery;
   a charging voltage to the battery-mounted equipment from power control equipment at a time of start of charging; and
   a history data including a charge time having been required for each charging, and a charging current quantity requested from the battery-mounted equipment is corrected based on battery deterioration calculated using the battery history data of the battery-mounted equipment.

5. A power monitoring and control method, using a plurality of power monitoring and control apparatuses for use in charging battery-mounted equipment from a power system through a battery charger, wherein
   a current control calculation value indicative of a current value available for charging the battery-mounted equipment from the power system and a charging request value indicative of a current value requested to the battery charger from the battery-mounted equipment are compared;
   smaller one among the current control calculation value and the charging request value is employed as a current control value indicative of a charging current to the battery-mounted equipment;
   for enabling charging of a plurality of battery-mounted equipment connected to the plurality of power monitoring and control apparatus, comprising:
   calculating by an external controller a value of a minimum charging current when charging the battery-mounted equipment from the power system;
   downloading by the power monitoring and control apparatus data relating to the power system from the external controller through a network at a time when the calculated minimum charging current value is outside of an allowed range of voltage of the power system; and
   controlling charging power to the battery-mounted equipment after the downloading.

6. A power monitoring and control method according to claim 5, wherein the external controller individually calculates charging quantities to the battery-mounted equipment connected to the external controller, from the power system, based on active power, reactive power and a voltage change in the power system, load forecast data in the power system, and measured values of voltage and power or an estimated value of state.

* * * * *